Sept. 25, 1973 KYOJI TACHIKAWA ET AL 3,761,254

ALLOY FOR SUPERCONDUCTIVE MAGNET

Filed Jan. 29, 1971

6 Sheets-Sheet 3

United States Patent Office

3,761,254

Patented Sept. 25, 1973

3,761,254

ALLOY FOR SUPERCONDUCTIVE MAGNET

Kyoji Tachikawa and Kiyoshi Inoue, Tokyo, Japan, assignors to The Director of National Research Institute for Metals, Tomoyoshi Kawada, Tokyo, Japan

Filed Jan. 29, 1971, Ser. No. 110,809
Claims priority, application Japan, Feb. 3, 1970, 45/8,949
Int. Cl. C22c *15/00, 27/00*
U.S. Cl. 75—134 V 4 Claims

ABSTRACT OF THE DISCLOSURE

A ternary alloy for superconductive magnet is composed of V, Hf and M where M is zirconium, chromium or tantalum.

BACKGROUND OF THE INVENTION

(1) Field of the invention

This invention relates to a novel material for a magnet to be used under a superconductive state at an extremely low temperature.

(2) Description of the prior art

Superconductive material is a material of which electric resistance is zero at an extremely low temperature. A strong magnetic field can be economically generated by large current flowing in a superconductive magnet with only a small consumption of power. Therefore, the magnet composed of superconductive alloy wire is now introduced into various experiment apparatus and MHD generator. In general, it is practically advantageous that the temperature at which superconductivity appears, i.e. critical temperature, is higher and the magnetic field at which superconductivity disappears, i.e. critical magnetic field is higher. In addition, a superconductive material should be easily fabricated into a wire for commercial purposes.

Heretofore, alloys and compounds of vanadium base and those of niobium base have been known as superconductive materials of high critical magnetic field and high critical temperature.

With respect to compound materials, only $Nb_3Sn$ has been practically used, but $V_3G_a$ and $V_3S_i$ will also be put to practical use soon. These compound materials have a critical magnetic field higher than 200 koe., but the compound materials are lacking in ductility when compared with alloy materials and therefore the working thereof is difficult and thereby the working cost becomes expensive. Among alloy materials, Nb-Ti, Nb-Zr, Nb-Zr-Ti and Nb-Ti-Ta alloys are very ductile and can be easily fabricated into wire. These alloy materials are now widely used in various fields, but their critical magnetic field is lower than 125 koe. Vanadium alloys such as V-Ti, V-Zr and V-Hf are reported to be of high critical temperature and high magnetic field, but have not yet been put to practical use. The V-Ti alloy has a critical temperature of 7.6° K. and high ductility, but the critical magnetic field at 4.2° K. is not so high, i.e. 72 koe. V-Zr alloy has a critical magnetic field of as high as 110 koe. at 4.2° K. and the critical temperature is 8.8° K. In addition, the maximum critical temperature of V-Hf alloy is 9.3° K.

SUMMARY OF THE INVENTION

The ternary alloy for superconductive magnet according to this invention comprises vanadium, hafnium and a metal selected from the group consisting of zirconium, chromium and tantalum. Hereinafter the composition of alloy is shown by atomic percent.

With respect to a V-Hf-Zr ternary alloy according to this invention, the contents of V, Hf and Zr are 98–20%, 0.1–80%, and 0.1–80%, respectively. With respect to a V-Hf-Cr ternary alloy according to this invention, the contents of V, Hf and Cr are 90–30%, 10–60%, and 0.1–40%, respectively. With respect to a V-Hf-Ta ternary alloy, according to this invention, the contents of V, Hf and Ta are 90–30%, 5–60%, and 0.1–40%, respectively.

An object of this invention is to provide a vanadium base alloy for superconductive magnet having a very high critical magnetic field for producing a strong magnetic field as well as a high critical temperature.

Another object of this invention is to provide a vanadium base alloy for superconductive magnet capable of being fabricated into thin wire or tape material for use as a magnet.

DESCRIPTION OF THE PREFERRED EMBODIMENTS

Figure 1:
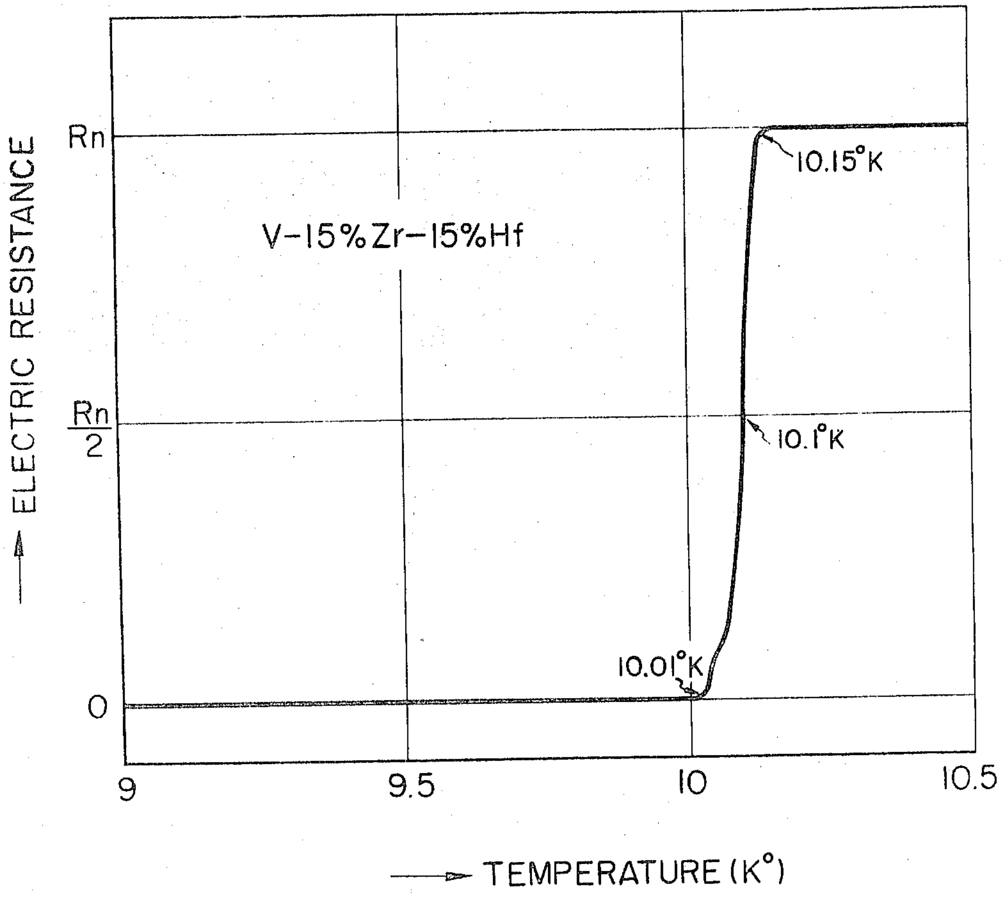
FIG. 1 represents a transition curve of a V-15% Zr-15% Hf alloy according to this invention.

The above-mentioned three ternary alloys according to this invention have a critical temperature ranging from 9° to 10.1° K. and a critical magnetic field exceeding 200 koe. The critical temperature of 9° K. corresponds to that of Nb-Ti alloy most widely used at the present time and is sufficiently high for practical use.

Critical current density is not an inherent property of a superconductive material, but varies, to a great extent, depending upon the production method. The higher the critical current density is, the better the superconductor is for use as a magnet. Therefore, the ternary alloys containing V and Hf according to this invention can be fabricated into superconducting wires by favorable methods taking into consideration the workability and superconductivity of the alloy. For example, there may be employed a conventional method comprising melting, plastic working and heat treatment in combination and, a method comprising the use of a heat diffusion process in a composite.

The ternary alloys of this invention, V-Hf-Zr alloy, V-Hf-Cr alloy and V-Hf-Ta alloy which contain vanadium of less than 40% or higher than 70%, may be produced by a plastic working method. For example, the mixture of three metal components for the desired alloy are melted by arc and cast to form a cast material. For the purpose of homogenizing a superconductive phase inferior in workability, the cast alloy is made into solid-solution at 950–1400° C. Then the cast alloy is fabricated into a thin wire or tape of a desired size and further heat-treated at 300–900° C. to recover excellent superconductive characteristics.

The ternary alloys, V-Hf-Cr and V-Hf-Ta, according to this invention containing 40–70% vanadium may be produced by the following method. Two metal elements capable of forming a solid solution are made into an alloy of high workability. The resulting binary alloy is folded with the third metal element or the resulting binary alloy is fitted into a pipe of the third metal, or vice versa, to form a composite. The composite thus obtained is fabricated into a wire or tape and subjected to heat diffusion treatment and thereby a wire material containing a diffusion layer of the homogeneous and continuous ternary alloy is produced. As combinations of metals for producing composites, there are preferably mentioned Hf-Zr alloy with V for V-Hf-Zr alloy, V-Cr alloy with Hf for V-Hf-Cr alloy, and V-Ta alloy with Hf or Hf-Ta alloy with V for V-Hf-Ta alloy. The heat diffusion is carried out by heating at 850–1300° C. in an inert atmosphere or under vacuum for several minutes or more. Thus there is formed a diffusion layer of the ternary alloy with excellent superconductivity containing 40–70% vanadium at the boundary between the binary alloy and a single element metal. According to the result of determination by X-ray microanalyzer, it was found that the ternary composition at the diffusion layer is affected by the heat treating temperature and composition of the binary alloy while the binary alloy diffuses without changing the ratio of the metal components to form a part of the diffusion layer and other part of the diffusion layer is formed with the third component. The vanadium content is relatively high at the portion where the heat treating temperature is high, for example, 1300° C. while the content is relatively low at the portion where the heat treating temperature is low.

An alloy according to this invention which is of low plastic workability may be fabricated into wire by simultaneous vapor deposition under vacuum of V, Hf, and Zr or Cr or Ta on a surface of a base wire material, by spray-coating of the molten ternary alloy by plasma jet on a base wire, or by vapor deposition of V, Zr, and Hf on a base wire by reducing gaseous halides of V, Zr, and Hf with hydrogen and simultaneously depositing the reduced metals. In the various above methods, the base wire may be one of the ternary alloy and the other two metals are coated thereon, or the base wire may be a material hardly reactable with each metal component the ternary alloy such as a stainless steel, quartz glass and the like.

The following examples are given for illustration, but should not construed as limitations.

EXAMPLE 1

V-Hf-Zr ternary alloy

Vanadium 70%, zirconium 15%, and hafnium 15% were mixed, pressed, and melted in a water-cooled copper crucible by arc to form an ingot. A sample for determination of critical temperature was cut out from the ingot, and the both ends of the sample were copper-plated and a lead wire for current and a lead wire for potential were soldered to each of the ends. The resulting sample was placed in a sample room, where the temperature distribution was made uniform by using a copper block. The critical temperature was determined by measuring simultaneously the resistance and the temperature change of the sample. The temperature change was adjusted by soaking the sample in liquid helium and taking out the sample from the liquid surface little by little. The critical temperature was 10.1° K. FIG. 1 shows the transition curve of this sample. The critical temperature was defined as the temperature where the resistance of the sample becomes a half of the value of resistance at normal conductive state.

In a similar way, critical temperatures of other V-Hf-Zr ternary alloys were measured. The result is illustrated in FIG. 2, which shows critical temperature isotherms of V-Hf-Zr ternary alloy.

Figure 2:
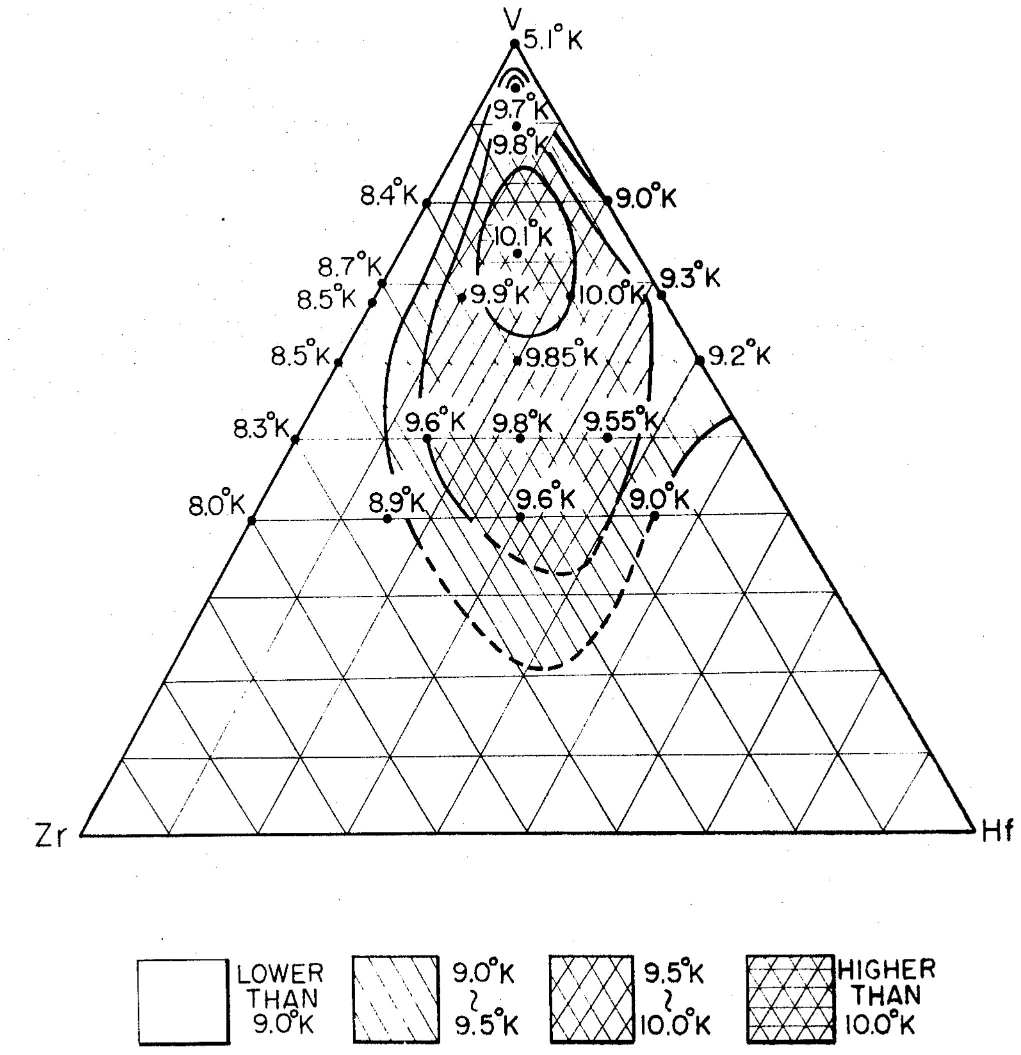
FIG. 2 represents critical temperature isotherms of V-Hf-Zr ternary alloy according to this invention.

As is clear from FIG. 2, the V-Hf-Zr ternary alloy containing 98–20% V, 0.1–80% Hf, and 0.1–80% Zr gives critical temperatures not lower than 9° K.

EXAMPLE 2

V-Hf-Zr ternary alloy

Figure 3:
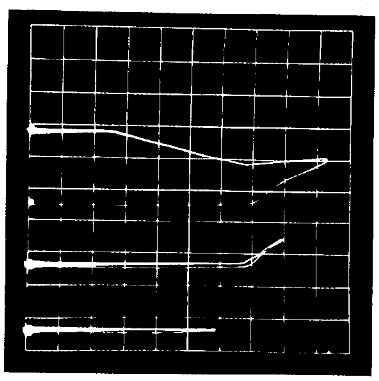
FIG. 3 represents a record of transition curves of an alloy according to this invention obtained by XY synchroscope.

Vanadium 66.7%, zirconium 23.2%, and hafnium 10% were mixed and arc-melted to form an ingot. Both ends of a bar-like sample cut out from the ingot were copper-plated and then a lead wire for current and a lead wire for potential were soldered thereto. The resulting bar-like sample was soaked in liquid helium and an external magnetic field was applied to the bar-like sample in a direction rectangular to the direction of current in the sample (longitudinal direction of the bar-like sample). The change of electric resistance caused by the external magnetic field was measured to determine the critical magnetic field. The external magnetic field was applied to the sample by discharging electric energy accumulated in a condenser bank through a coil in a short time and converting the electric energy to magnetic energy, that is, pulsed magnetic field. The rise-time of the pulsed magnetic field was 20 msec. As a result of the determination, the critical magnetic field of the ternary alloy was 220 koe. at 4.2° K. and the current density of the sample was $10^2$ a./cm.$^2$. FIG. 3 shows a record of the transition curve obtained by the XY synchroscope when a sample current was at a current density of $10^2$ a./cm.$^2$. The abscissa represents the magnetic field strength (32 koe./one division) and the ordinate represents electric resistance. The lower curve represents the record for a pulsed magnetic field lower than the critical magnetic field, the middle one that for about critical magnetic field, and the upper one that for higher than the critical magnetic field.

Table 1 illustrates critical magnetic field for six kinds of V-Hf-Zr ternary alloys determined in a similar way to the above.

TABLE 1

| | Composition (atomic percent) | | | Critical magnetic field (koe.) |
|---|---|---|---|---|
| | V | Zr | Hf | |
| Sample: | | | | |
| A | 67 | 23 | 10 | 220. |
| B | 67 | 10 | 23 | Higher than 220. |
| C | 74 | 13 | 13 | Do. |
| D | 60 | 20 | 20 | Do. |
| E | 50 | 25 | 25 | 170. |
| F | 25 | 37.5 | 37.5 | 120. |

In the above table, "higher than" in the column of critical magnetic field means that the critical magnetic field of the sample exceeded the capacity of the measuring instrument.

EXAMPLE 3

Figure 4:
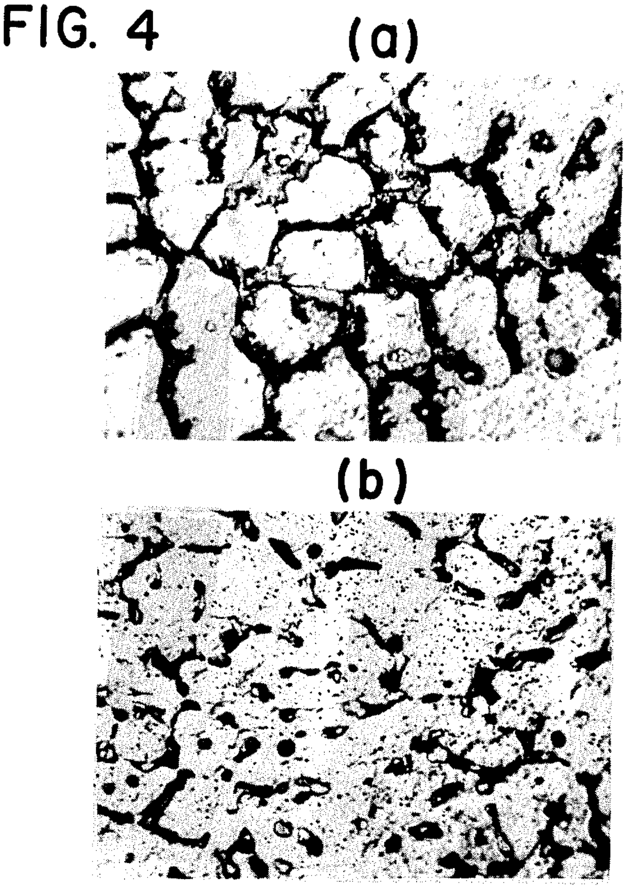
FIG. 4 represents optical microscopic photographs of an alloy.

Vanadium 90%, hafnium 5% and zirconium 5% were formed into ingots in a way similar to Example 1. The critical temperature of the resulting alloy was measured in a way similar to Example 1 and was determined to be 9.8° K. The ingot was heated at 1200° C. for five hours at $5\times10^{-6}$ mm. Hg, followed by quenching to homogenize the alloy. Although the critical temperature was decreased to 8.7° K., the resulting alloy was excellent in workability. The alloy material thus homogenized was cold-worked into a wire of 0.5 mm. in diameter and subjected to heat treatment at 600° C. for 20 hours. The resulting wire material recovered the critical temperature corresponding to the alloy since a phase having a critical temperature of 9.8° K. appeared again. The critical temperature of the resulting alloy wire material was measured in a way similar to Example 2 to give 180 koe. at 4.2° K. Thus it was a superconductive material of high quality. FIG. 4 illustrates optical microscopic photographs of an alloy after melting and an alloy after solid solution treatment in the preparation process. The network deposition phase of the alloy after melting shown in photograph (*a*) disappears by solid solution treatment as shown in photograph (*b*), but it appears again in a large amount as a result of heat treatment after the cold-working into a wire. Such change of system is relevant to changes of workability and superconductivity.

EXAMPLE 4

Figure 5:
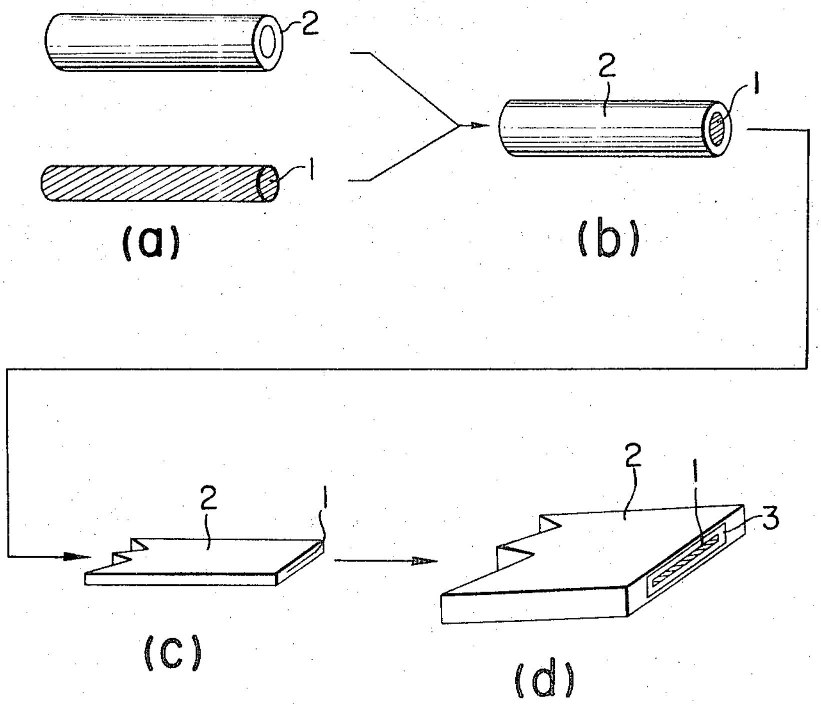
FIG. 5 shows diagrammatically a process for producing a tape of an alloy of this invention.

For the purpose of forming superconducting tapes of ternary alloys according to this invention containing vanadium ranging from 40 to 70%, a bar-like Hf-50% Zr alloy 1 was fitted into a vanadium pipe 2 as shown in FIGS. 5(*a*) and (*b*) and subjected to cold working to form a tape of 3 mm. wide and 0.2 mm. thick as shown in FIG. 5(*c*). The tape is a composite comprising a vanadium portion and a Hf-50% Zr alloy portion closely contacting each other. This composite tape was heated at a constant temperature between 850 and 1300° C. at $10^{-5}$ mm. Hg to form a superconductor as shown in FIG. 5(*d*) comprising a V-Hf-Zr ternary alloy 3 in FIG. 5(*d*) of high superconductivity produced by heat diffusion at the interface between vanadium and Hf-50% Zr alloy. The heat treating conditions, composition and property of the resulting superconductors are illustrated in Table 2 below.

As is clear from Table 2, V-Hf-Ta alloy and V-Hf-Cr alloy are excellent superconductive magnetic materials for high magnetic field as V-Hf-Zr alloy.

The V-Hf-Zr ternary alloy according to this invention has a critical temperature of higher than 9° K. and maximum 10.1° K. which is the highest critical temperature and higher than any of conventional vanadium alloy superconductors. The critical magnetic field of the ternary alloy determined by using a pulsed strong magnetic field is as high as 220 koe. at 4.2° K. and far higher than that of conventional Nb-Ti-Ta alloy having the highest critical magnetic field, 125 koe. in superconducting alloy. Furthermore, this ternary alloy according to this invention has a critical magnetic field higher than a practically used intermetallic compound, that is, $Nb_3Sn$ having critical magnetic field of 210 koe. In view of the foregoing, the alloys according to this invention are excellent superconductive magnet materials for producing a strong magnetic field.

TABLE 2

| Working method | Sample | Conditions of diffusion heat treatment | Composition (atomic percent) V | Zr | Hf | Critical current density, a./cm.$^2$ (applied magnetic field (30 koe.) | Critical temperature, ° K. |
|---|---|---|---|---|---|---|---|
| Method according to Example 4 as above | G | 1,050° C. ×25 hr | 65 | 17.5 | 17.5 | $2.5\times10^5$ | 9.9 |
| | H | 1,025° C.×50 hr | 62 | 19 | 19 | $3.0\times10^5$ | 9.8 |
| | I | 1,000° C.×50 hr | 58 | 21 | 21 | $3.0\times10^5$ | 9.6 |
| | J | 975° C.×100 hr | 50 | 25 | 25 | $3.5\times10^5$ | 9.6 |
| Arc melting method | K | ---------- | 50 | 25 | 25 | $2.3\times10^4$ | 9.8 |

As is clear from the above table, the feature of superconductor wire materials resides in high critical current. The superconductive critical current is ten times as high as that of a superconductor sample K prepared by the arc melting method listed in the above table.

EXAMPLE 5

Ternary alloys, V-Hf-Ta alloy and V-Hf-Cr alloy, were produced by an arc-melting method similar to Example 1.

Figure 6:
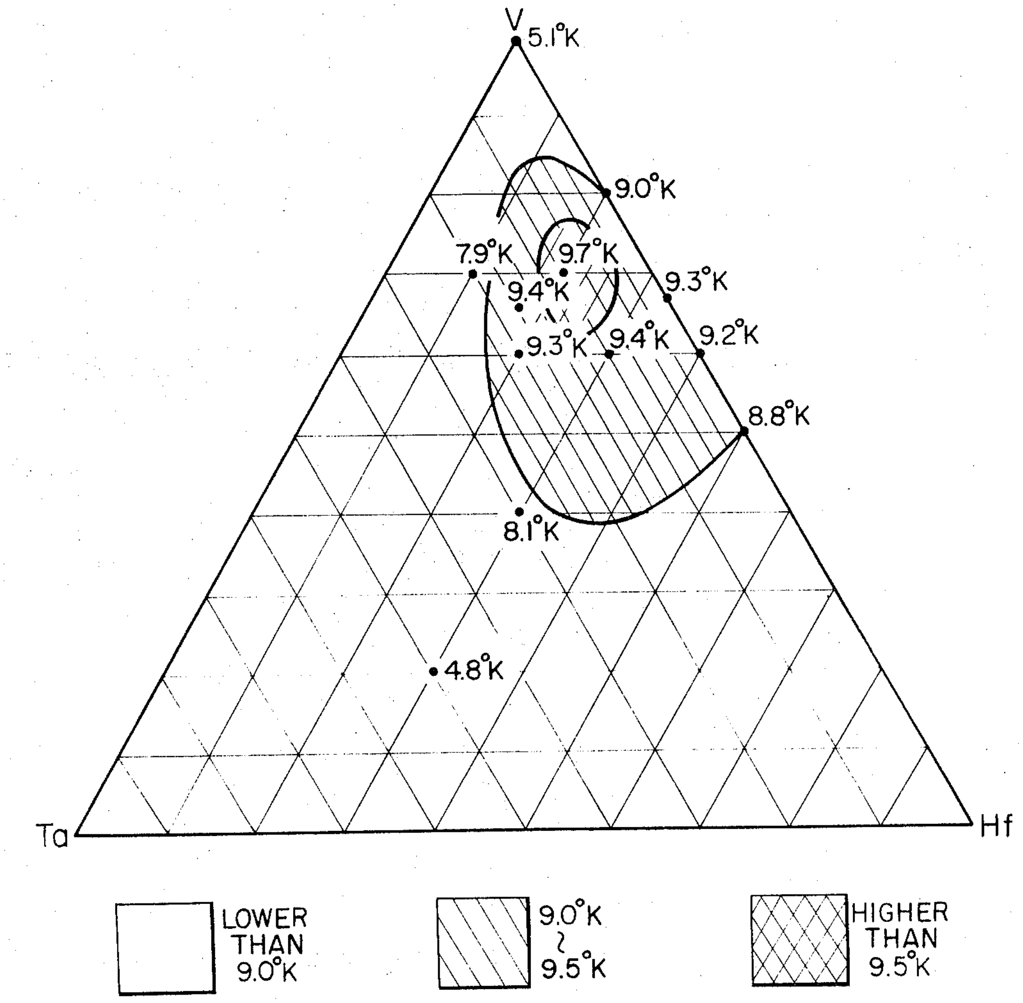
FIG. 6 represents critical temperature isotherms of a V-Hf-Ta ternary alloy.
Figure 7:
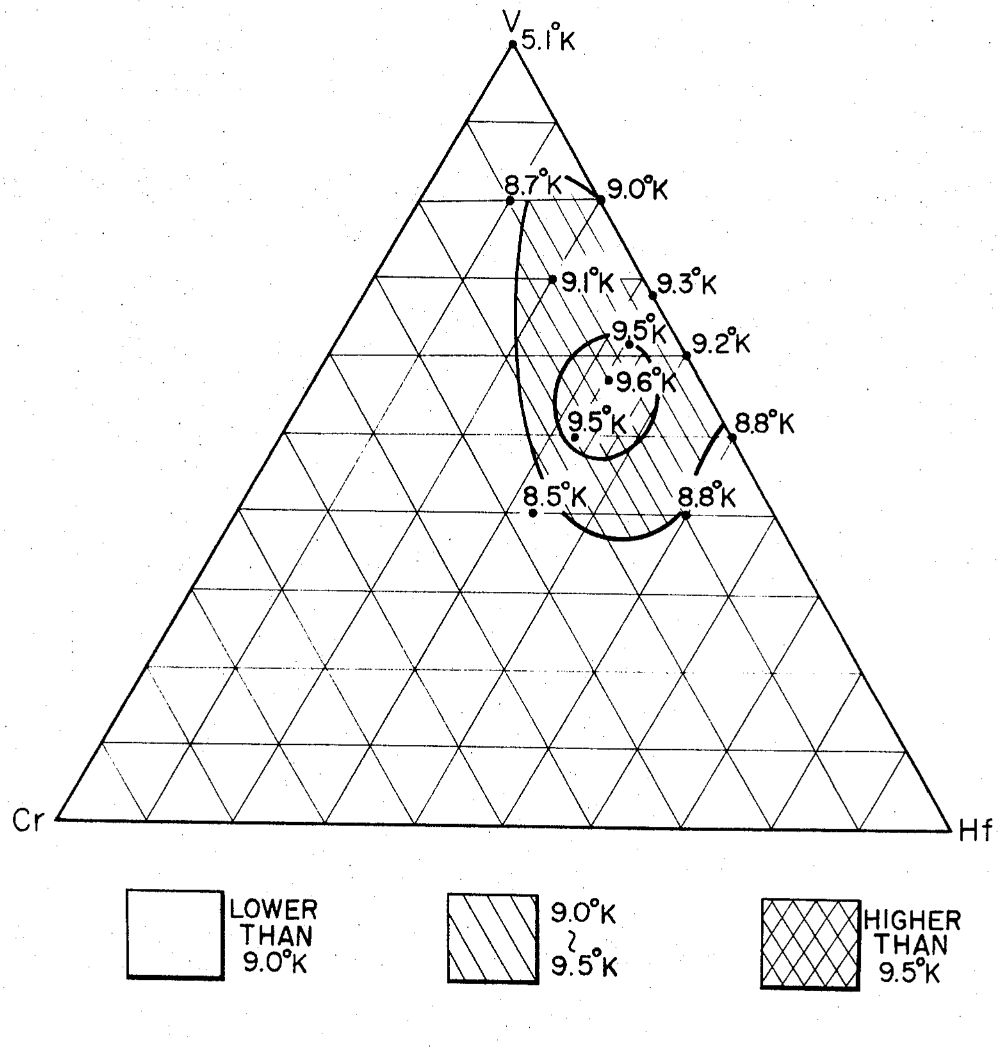
FIG. 7 represents critical temperature isotherms of a V-Hf-Cr ternary alloy.

FIG. 6 and FIG. 7 are triangular coordinates for V-Hf-Ta alloy and V-Hf-Cr alloy showing critical temperature not lower than 9° K. As is clear from these figures, the V-Hf-Ta alloy containing 90–30% V, 5–60% Hf and 0.1–40% Ta gives critical temperatures not lower than 9° K., and further, the V-Hf-Cr alloy containing 90–30% V, 10–60% Hf and 0.1–40% Cr gives critical temperatures not lower than 9° K. The critical magnetic field of the above mentioned ternary alloys was determined in a way similar to Example 2 and is shown in Table 3 below.

TABLE 3

| Sample | Composition (atomic percent) V | Hf | Cr | Ta | Critical magnetic field (koe.) |
|---|---|---|---|---|---|
| L | 70.0 | 20.0 | 10.0 | 0 | Higher than 220. |
| M | 60.0 | 30.0 | 10.0 | 0 | 215. |
| N | 56.0 | 33.3 | 0 | 10.0 | 220. |
| P | 50.0 | 33.0 | 0 | 16.7 | 210. |

What is claimed is:

1. An alloy for a superconductive magnet consisting essentially of from 20 to 98 atomic percent vanadium, from 0.1 to 80 atomic percent hafnium and from 0.1 to 80 atomic percent of a metal selected from the group consisting of zirconium, chromium and tantalum.

2. An alloy according to claim 1 consisting essentially of from 20 to 98 atomic percent vanadium, from 0.1 to 80 atomic percent hafnium and from 0.1 to 80 atomic percent zirconium.

3. An alloy according to claim 1 consisting essentially of from 30 to 90 atomic percent vanadium, from 10 to 60 atomic percent hafnium and from 0.1 to 40 atomic percent chromium.

4. An alloy according to claim 1 consisting essentially of from 30 to 90 atomic percent vanadium, from 5 to 60 atomic percent hafnium and from 0.1 to 40 atomic percent tantalum.

References Cited

UNITED STATES PATENTS

| | | | |
|---|---|---|---|
| 3,028,236 | 4/1962 | Wlodek et al. | 75—174 |
| 3,188,530 | 6/1965 | Matthias | 75—134 V X |
| 3,416,917 | 12/1968 | De Sorbo | 75—174 |

L. DEWAYNE RUTLEDGE, Primary Examiner

E. L. WEISE, Assistant Examiner

U.S. Cl. X.R.

75—174, 176, 177